June 3, 1958 W. W. GOLDSWORTHY 2,837,640
PULSE HEIGHT ANALYZER
Filed Sept. 3, 1953
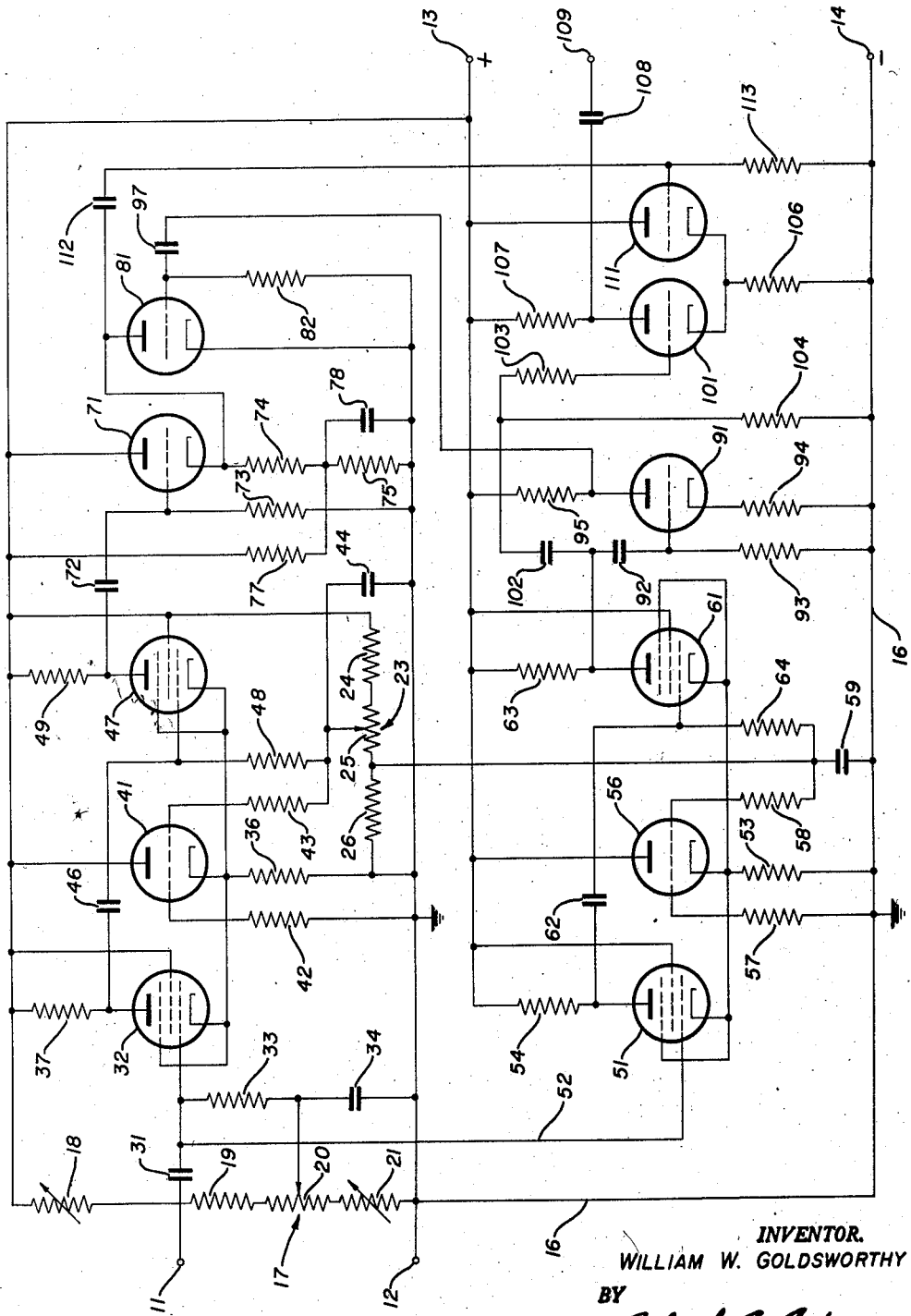
INVENTOR.
WILLIAM W. GOLDSWORTHY
BY
ATTORNEY.

United States Patent Office 2,837,640
Patented June 3, 1958

2,837,640

PULSE HEIGHT ANALYZER

William W. Goldsworthy, Orinda, Calif., assignor to the United States of America as represented by the United States Atomic Energy Commission Application September 3, 1953, Serial No. 382,503

3 Claims. (Cl. 250—27)

The present invention relates to pulse height analyzers and, more particularly, to a differential pulse height discriminator circuit.

Many types of pulse height analyzers have been developed, since the utilization of radioactive materials in medical and industrial applications has become advantageous. In many of such analyzers the circuitry is complicated and some require special types of elements. In those analyzers of the differential type having substantially uncomplicated circuits it is necessary to provide a plurality of channels of such circuits, each performing the same function with respect to pulses of differing height. In analyzers of the latter type, the circuits are such that it is not feasible to utilize them as a single channel differential analyzer because the response thereof has been found to be inadequate.

It is therefore an object of the present invention to provide a new and improved differential pulse height discriminator circuit.

Another object of the invention is to provide a differential pulse height discriminator circuit readily adaptable for operation in a single channel pulse height analyzer.

Still another object of the invention is to provide a discriminator circuit having high stability at low pulse heights and good transfer characteristics.

A further object of the invention is to provide a differential discriminator having a pair of discriminator circuits, respectively responsive to different pulse heights, operating into an anticoincidence circuit.

A still further object of the invention is to provide a simple differential pulse height discriminator comprising conventional elements operating well within their ratings.

Other objects and advantages of the invention will be apparent in the following description and claims considered together with the acompanying drawing which is a schematic wiring diagram.

Referring to the drawing in detail, there is provided a pair of input terminals 11 and 12 for connection to a source of pulses to be analyzed such as a scintillation detector and amplifier combination (not shown). A second pair of terminals 13 and 14 are provided for connection to a source of unidirectional voltage (not shown) with the terminal 13 connected to the positive side and the terminal 14 to the negative side. A grounded lead 16 is connected between the terminal 12 of one pair and the terminal 14 of the other pair. A first voltage divider 17 comprising a variable resistor 18, a fixed resistor 19, a variable resistor 20, and a variable resistor 21 is series-connected in such order between the positive terminal 13 and the grounded terminal 14. A second voltage divider 23 comprising a fixed resistor 24, a variable resistor 25, and a fixed resistor 26 is similarly connected between the positive terminal 13 and the grounded terminal 14.

The input terminal 11 is connected through a coupling capacitor 31 to the control grid of a pentode type tube 32. A bias voltage is applied to the control grid of the tube 32 by connecting a resistor 33 and a by-pass capacitor 34 between the control grid and the grounded lead 16 with the junction between such elements connected to the adjustable arm of the variable resistor 20 of the first voltage divider 17. The suppressor grid of the tube 32 is connected directly to the cathode which is, in turn, connected through a resistor 36 to the grounded lead 16. To complete the operating connections of the tube 32, the screen grid is directly connected to the positive terminal 13 and the anode is connected through a dropping resistor 37 to such positive terminal.

The cathode of a triode tube 41 is directly connected to the cathode of the tube 32. The control grid of such triode tube 41 is connected through a resistor 42 to the grounded lead 16 and through a resistor 43 to the adjustable arm of the variable resistor 25 of the second voltage divider 23 which is connected through a by-pass capacitor 44 to the grounded lead 16. The remaining operating connection of the tube 41 is a direct connection from the anode to the positive terminal 13.

A coupling capacitor 46 is connected between the anode of the pentode tube 32 and the control grid of a second pentode tube 47, such control grid also being connected through a resistor 48 to the adjustable arm of the variable resistor 25 of the second voltage divider 23. A direct connection is made from the suppressor grid of the tube 47 to the cathode thereof and to the cathodes of the two previously described tubes 32 and 41. Other operating connections of the second pentode tube 47 comprise a direct connection from the screen grid to the positive terminal 13 and a connection from the anode through a dropping resistor 49 to the positive terminal 13.

The circuit, described in the preceding paragraphs and comprising the first and second pentode tubes 32 and 47 and the triode tube 41, serves as an upper level discriminator. The adjustable arm of the variable resistor 25 is set so that a positive voltage having a predetermined value is applied to the control grid of the second pentode tube 47 and to the control grid of the triode tube 41. In the absence of a negative-going signal at the anode of the first pentode tube 32, the second pentode tube 47 is conductive thereby drawing current through the common cathode resistor 36 in such direction as to develop a positive voltage at the cathode of each tube. By adjusting the setting of the adjustable arm of the variable resistor 20 to a predetermined value below the value of voltage across the common cathode resistor 36, the control grid of the first pentode tube 32 is biased so that the tube is sensitive only to pulses at the input terminal 11 having values greater than the difference between such two values of voltage. In such manner then the upper level discriminator is rendered pulse height selective and the voltage, at which the second pentode tube 47 becomes nonconductive, has been established.

There is also provided a lower level discriminator comprising elements similar to the upper discriminator and operating at the same input pulse height but adapted to develop an output voltage at a lower level as will be explained more fully hereinafter. The control grid of the first pentode tube 32 in the upper discriminator is directly connected to the control of a first pentode tube 51 by a lead 52 in the lower discriminator. A direct connection is made from the suppressor grid of the pentode tube 51 to the cathode and such latter element is connected through a resistor 53 to the grounded lead 16. Other operating connections of the pentode tube 51 comprise a direct connection from the screen grid to the positive terminal 13 and a dropping resistor 54 connected between the anode and the positive terminal 13. A triode tube 56 has the cathode thereof directly connected to the cathode of the first pentode tube 51 and the anode directly connected to the positive terminal 13. The control grid of the triode tube 56 is connected through a resistor 57 to the grounded lead 16 and through a resistor 58 to the junction between the fixed resistor 26 and the variable resistor 25 of the second voltage divider 23, such junction being connected through a bypass capacitor 59 to the grounded lead 16.

Changes in voltage at the anode of the first pentode tube 51 are coupled to the control grid of a second pentode tube 61 by a capacitor 62 connected therebetween. The suppressor grid of the second pentode tube 61 is directly connected to the cathode which, in turn, is directly connected to the cathode of the first pentode tube 51. The screen grid is directly connected to the positive terminal 13 and a dropping resistor 63 is connected between the anode and the positive terminal 13. To complete the operating connections of the second pentode tube 61, a resistor 64 is connected between the control grid and the junction between the fixed resistor 26 and variable resistor 25 of the second voltage divider.

It will be noted from the foregoing description of the lower discriminator that the circuit will accept input pulses of the same height as are accepted by the upper discriminator. Also by the connection of the control grids of the triode tube 56 and the second pentode tube 61 to the second voltage divider 23 a bias voltage of lesser value is applied than that impressed upon the similar tubes 41 and 47 in the upper discriminator. The result of such conditions is that the second pentode tube 61 in the lower discriminator becomes cut off at a lower value of input pulse than the second pentode tube 47 in the upper discriminator.

The two pentode tubes 32 and 47 in the upper discriminator and the two similar pentode tubes 51 and 61 in the lower discriminator are connected in the form of Schmidt discriminators which are well known in the art. Operation of the conventional Schmidt discriminator has been improved by increasing the loop gain, increasing the coupling time constant, and providing a cathode clamp tube to improve the conduction transfer characteristics. Consider now the operation of the upper discriminator when an input pulse occurs having a sufficient value to render the first pentode tube 32 conductive. Current flowing through the resistor 37 results in a decrease in anode voltage of the first pentode tube 32 and such decrease is coupled to the control grid of the second pentode tube 47. If the applied decrease in voltage is of sufficient magnitude, the control grid will become more negative than the cathode to render the second pentode tube 47 nonconductive. The triode tube 41 is biased so that the tube conducts during the transfer time of the circuit and, in this manner, the voltage across the cathode resistor 36 is maintained at a value such that grid control of the first pentode tube 32 is not lost. Therefore the conduction transfer characteristics of the tubes 32 and 47 are improved so that at the termination of an input pulse the first pentode tube 32 will become nonconductive and the second pentode tube 47 will be conductive. If the applied decrease in voltage at the control grid of the second pentode tube 47 is less than that necessary to render the tube nonconductive, there is no alteration of the condition of the tube. Both the upper and lower discriminator circuits operate in a similar manner so that input pulses having a value above the setting of the upper discriminator result in a positive-going pulse at the anode of the second pentode tube 47 whereas input pulses having a value above the setting of the lower discriminator result in a similar pulse at the anode of the second pentode tube 61.

Referring now to the upper discriminator, voltage changes at the anode of the second pentode tube 47 are coupled to the control grid of a triode tube 71 by a capacitor 72 connected therebetween. The control grid of such triode tube 71 is connected through a resistor 73 to ground. The cathode of the tube 71 is connected to one end of two series-connected resistors 74 and 75, the other end of which is connected to ground. The junction between such resistors 74 and 75 is connected through a resistor 77 to the positive terminal 13 and through a capacitor 78 to ground. To complete the operating connections of the triode tube 71 the anode is directly connected to the positive terminal 13. Thus, there is provided a cathode follower circuit, and the values of the circuit elements are such as to form with the interelectrode capacitance of the triode tubes 71 and 81 a pulse lengthener, the requirement of which will be set forth hereinafter.

To limit the duration of the voltage developed at the cathode of the triode tube 71 to the duration of the output pulse of the lower discriminator, a second triode tube 81 is provided with the anode directly connected to the cathode of the first triode tube 71. The cathode of such second triode tube 81 is directly connected to the grounded lead 16 and a resistor 82 is connected between the control grid and the grounded lead 16. The further connections and manner of control of the control grid will be set forth in detail hereinafter.

Referring now to the lower discriminator, voltage changes at the anode of the second pentode tube 61 are coupled to the control grid of a triode tube 91 by a capacitor 92. Such triode tube 91 serves as an inverter and is operated with the control grid connected through a resistor 93 to the grounded lead 16, the cathode connected through a resistor 94 to the grounded lead 16, and the anode connected through a dropping resistor 95 to the positive terminal 13. Voltage changes at the anode of the tube 91 are coupled to the control grid of the previously described triode tube 81 by a capacitor 97. Thus the control grid of the triode tube 81 is impressed with a negative-going pulse during the time the anode of the second pentode tube 61 in the lower discriminator has a positive-going pulse. The result of such connections is to limit the stretched pulse at the cathod of the triode tube 71 to the duration of the output pulse of the lower discriminator.

The voltage changes at the anode of the second pentode tube 61 in the lower discriminator are also coupled to the control grid of another triode tube 101 by a series-connected capacitor 102 and resistor 103 connected therebetween in such order. The junction between such capacitor 102 and resistor 103 is connected through a resistor 104 to the grounded lead 16. Further operating connections of the tube 101 comprise a resistor 106 connected from the cathode to the grounded lead 16 and a dropping resistor 107 connected from the anode to the positive terminal 13. A coupling capacitor 108 is connected from the anode of such tube 101 to an output terminal 109 which serves as the output for the circuit. The triode tube 101 operates in conjunction with another triode tube 111 as an anticoincidence circuit and the latter tube 111 has a direct connection from the cathode to the cathode of the former tube 101 and a direct connection from the anode to the positive terminal 13. To control the tube 111 a series-connected capacitor 112 and resistor 113 is connected between the anode of the tube 81 and the grounded lead 16 with the junction between the two elements 112 and 113 connected to the control grid of the tube 111. With such connections of the tubes 101 and 111 having a common cathode resistor, the simulatneous occurrence of a positive pulse at the control grids of the tubes will result in no output pulse at the output terminal 109 because conduction of the tube 111 prevents conduction of the other tube. Only when the incoming pulse has a peak value between the operating levels of the upper and lower discriminators does an output pulse occur at the output terminal 109.

Consider now the operation of the above-described single channel pulse height analyzer with the input terminals 11 and 12 suitably connected to a source of pulses to be analyzed and the terminals 13 and 14 connected to a source of operating potential. For simplicity of explanation an example will be set forth and the specified voltages will be referenced during the description of operation. Thus, for example, it is desired to count pulses having a maximum or peak value between 5 and 10 volts. In such instance both the upper and lower discriminators are rendered operative to receive all pulses having a value greater than 5 volts and to reject all pulses having a peak value less than such value. Such discrimination is accomplished by suitably setting the variable resistor 20 to adjust the bias for the input tubes 32 and 51 of the discriminators. Also, it is necessary to bias the output tubes 47 and 61 of the two discriminators so that trigger action occurs in the lower discriminator at 5 volts and in the upper discriminator at 10 volts. Such action is accomplished by suitable connection from the second voltage divider 23 to the control grid of the tube 61 and by adjustment of the variable resistor 25 which is connected to the control grid of the tube 47.

As has been stated nothing occurs in the circuit when the input pulses have a peak value less than 5 volts. Next the effect of an input pulse having a value between 5 and 10 volts, for example 8 volts, will be considered. Such 8 volt pulse will cause both tubes 32 and 51 in the discriminators to conduct, the latter tube 51 conducting more heavily because of the biasing effects of the respective cathode resistors 36 and 53. The triggering condition is reached in the lower discriminator but not in the upper discriminator. Thus, tube 61 becomes cut off while tube 47 continues in the normal conducting state so that a positive-going pulse appears only at the anode of the tube 61 in the lower discriminator. Such pulse is coupled by the capacitor 102 to the control grid of the triode tube 101 and thereby renders such tube conductive. Thus, a negative-going pulse occurs at the anode of the tube 101 and is coupled to the output terminal 109 where the pulse is available to operate a register or subsequent control circuit. It is to be noted that there is no pulse applied to the tube 111 of the anticoincidence circuit so that there is no effect thereon.

Another possibility necessary to consider is the instance where the input pulse has a maximum value exceeding 10 volts. Both the upper and lower discriminators are triggered in such instance and a positive-going pulse is formed at the anode of the tubes 47 and 61 at the output of the respective discriminators. Since the usual incoming or input pulse has finite rise and fall times, the output pulse of the upper discriminator will tend to be narrower and will lag the output pulse of the lower discriminator. To partially overcome the foregoing, the cathode follower tube 71 is connected to have a long time constant load in the cathode circuit and such effect is accomplished by the resistor 74 and the interelectrode capacitance of the tube. The result is a positive-going pulse having a longer duration at the cathode of the tube 71 than the pulse applied to the control grid. The cathode of the cathode follower tube 71 is coupled to the control grid of the tube 111 in the anticoincidence circuit so that no output pulse will occur at the output terminal 109.

The positive-going output pulse of the lower discriminator is taken from the anode of tube 61 and is coupled to the control grid of the tube 101 in the anticoincidence circuit. To delay the leading edge of the impressed pulse so that the output pulses of both discriminators are in synchronism at the anticoincidence circuit, the resistor 103 and the input interelectrode capacitance of the tube 101 form an integrator circuit and introduce a delay in the operation of such tube. Thus, the pulses at the control grid of both tubes 101 and 111 are synchronized and there is no output pulse of voltage at the terminal 109. The output pulse of the lower discriminator is also coupled to the inverter tube 91 so that a negative-going pulse is applied to control grid of discharge tube 81 which prevents conduction of such tube and permits the passage of the pulse from the cathode of tube 71 to the control grid of tube 111. At the termination of the negative-going pulse, tube 81 conducts to discharge the interelectrode capacitance of the tube 71 and return the circuit to normal operating condition.

The circuit, as described in the foregoing, may be readily utilized to obtain a pulse height spectrum of a source of pulses by the addition of a few simple elements and by connecting a recorder to the output terminal 109. Such additional elements comprise conventional automatic means for varying the pulse height selection voltage and the "window width," at which pulses are counted, in a predetermined manner. It is also possible to operate the circuit as an integral discriminator and during such operation the control grid of the second tube 111 of the anticoincidence circuit is biased highly negative to block action thereof.

While the salient features of the present invention have been described in detail with respect to one embodiment, it will be apparent that numerous modifications may be made within the spirit and scope of the invention, and it is therefore not desired to limit the invention to the exact details shown except insofar as they may be defined in the following claims.

What is claimed is:

1. In a differential pulse height analyzer, the combination comprising a first and second pulse height discriminator connected to an input means connected to said first discriminator circuit rendering the same responsive to pulses having values greater than a first minimum value, means connected to said second discriminator circuit rendering the same responsive to pulses having values greater than a second minimum value, said first value being less than said second value, an anticoincidence circuit having at least two interconnected vacuum tubes with a common cathode resistor, a resistor connected between the output of said first discriminator circuit and a control grid of one of said tubes whereby pulses are delayed, a cathode follower tube having a cathode resistor of such value as to provide a long time constant with the interelectrode capacitance of the tube, said cathode follower tube connected between the output of said second discriminator circuit and a control grid of the other of said tubes, and discharge means responsive to the output of said first discriminator circuit connected across said cathode resistor.

2. In a pulse height discriminator circuit, the combination comprising a source of operating potentials having positive and negative terminals, a first, second, and third vacuum tube, each of said vacuum tubes having at least an anode, a control grid, and a cathode with a common cathode resistor of constant value connected to said negative terminal, a first dropping resistor connected from the anode of said first tube to said positive terminal, a second dropping resistor connected from the anode of said second tube to said positive terminal, a direct connection being made from the anode of said third tube to said positive terminal, means connected to the control grid of said first tube for rendering such tube nonconductive by a selected discrimination voltage, means connected to the control grid of said second tube rendering such tube conductive by a selected increment, means connected to the control grid of said third tube rendering the tube conductive at all times, means for coupling pulses to the control grid of said first tube, and a coupling capacitor connected from the anode of said first tube to the control grid of said second tube.

3. A differential pulse analyzer as claimed in claim 1 further defined by said discharge means comprising a by-pass vacuum tube connected across said cathode follower resistor and having control means, and means inverting the output of said first discriminator circuit and applying same to the control means of said by-pass tube for thereby rendering same nonconducting whereby signals from said second discriminator circuit are passed to said anticoincidence circuit.

References Cited in the file of this patent

UNITED STATES PATENTS

| | | |
|---|---|---|
| 2,482,544 | Jacobsen | Sept. 20, 1949 |
| 2,514,162 | Peterson | July 4, 1950 |
| 2,529,666 | Sands | Nov. 14, 1950 |
| 2,536,032 | Clark | Jan. 2, 1951 |
| 2,538,027 | Mozley | Jan. 16, 1951 |
| 2,552,013 | Orpin | May 8, 1951 |
| 2,558,100 | Rambo | June 26, 1951 |
| 2,564,692 | Hoeppner | Aug. 21, 1951 |
| 2,568,319 | Christensen | Sept. 18, 1951 |
| 2,591,247 | Farnsworth | Apr. 1, 1952 |
| 2,715,181 | Glenn | Aug. 9, 1955 |
| 2,760,064 | Bell | Aug. 21, 1956 |

OTHER REFERENCES

"A Circuit for the Study Etc.," July 1949, pp. 485–488, The Review of Scientific Instruments vol. 20, No. 7.

Circuit for Anticoincidences, etc. March 1940, pp. 84–85, Ryerson Physical Lab., vol. 11.

"Electronics for Cosmic Ray Exp.," August 1947, pp. 551–556, The Review of Scientific Instruments vol. 18, No. 8.

Waveforms, page 349, Fig. 9—28, Radiation Lab. Series 19, 1949.

Electronic Circuits and Tubes, McGraw-Hill Book Co., pp. 712–714.